United States Patent
Huang et al.

(10) Patent No.: US 9,000,748 B2
(45) Date of Patent: Apr. 7, 2015

(54) MAXIMUM POWER POINT TRACKING CONTROLLERS AND MAXIMUM POWER POINT TRACKING METHODS

(75) Inventors: Chao-Jen Huang, Taichung (TW); Chien-Chun Lu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 359 days.

(21) Appl. No.: 13/563,413

(22) Filed: Jul. 31, 2012

(65) Prior Publication Data

US 2013/0141067 A1  Jun. 6, 2013

(30) Foreign Application Priority Data

Dec. 2, 2011 (TW) .............................. 100144310 A

(51) Int. Cl.
*G05F 1/67* (2006.01)
*H02M 3/156* (2006.01)

(52) U.S. Cl.
CPC . *G05F 1/67* (2013.01); *H02M 3/156* (2013.01)

(58) Field of Classification Search
CPC ........... G05F 1/67; H02M 3/156; Y02E 10/58
USPC ......................................... 323/282–285, 906
See application file for complete search history.

(56) References Cited

U.S. PATENT DOCUMENTS

| | | | |
|---|---|---|---|
| 5,867,011 A | 2/1999 | Jo et al. | |
| 5,923,158 A * | 7/1999 | Kurokami et al. | 323/299 |
| 6,844,739 B2 | 1/2005 | Kasai et al. | |
| 6,919,714 B2 | 7/2005 | Delepaut | |
| 6,984,970 B2 | 1/2006 | Capel | |
| 8,810,213 B2 * | 8/2014 | Kim et al. | 323/222 |
| 8,816,667 B2 * | 8/2014 | Lee | 323/299 |
| 2002/0163323 A1 | 11/2002 | Kasai et al. | |
| 2003/0117822 A1 * | 6/2003 | Stamenic et al. | 363/132 |
| 2004/0124816 A1 | 7/2004 | DeLepaut | |
| 2006/0226823 A1 * | 10/2006 | O'Meara | 323/283 |

(Continued)

FOREIGN PATENT DOCUMENTS

| | | |
|---|---|---|
| CN | 1512286 | 7/2004 |
| CN | 1731651 | 2/2006 |

(Continued)

OTHER PUBLICATIONS

Taiwan Patent Office, Office Action, Patent Application Serial No. 100144310, Mar. 18, 2014, Taiwan.

(Continued)

*Primary Examiner* — Fred E Finch, III

(57) ABSTRACT

A maximum power point tracking controller, suitable for controlling an output voltage of a power converter is provided, including a slope detection unit and a control unit. The slope detection unit calculates whether the output voltage is in a positive trend or in a negative trend according to a detection signal corresponding to the output voltage in order to output a trend signal, in which the voltage level of the trend signal is a first voltage level or second voltage level when the output voltage is in the positive trend or negative trend. The control unit has first and second operation modes to respectively increase and decrease a duty cycle of a PWM signal, in which the control unit switches current operation mode to perform a maximum power point tracking procedure when the trend signal is changed from the first voltage level to the second voltage level.

28 Claims, 11 Drawing Sheets

(56) References Cited

U.S. PATENT DOCUMENTS

| | | | |
|---|---|---|---|
| 2008/0141998 A1* | 6/2008 | Sun | 126/601 |
| 2008/0179961 A1 | 7/2008 | Kimball et al. | |
| 2008/0203994 A1* | 8/2008 | Park | 323/318 |
| 2009/0078300 A1 | 3/2009 | Ang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2009/0316447 A1 | 12/2009 | Kim et al. | |
| 2010/0123428 A1 | 5/2010 | Wu et al. | |
| 2010/0171482 A1 | 7/2010 | Ye et al. | |
| 2010/0208501 A1 | 8/2010 | Matan et al. | |
| 2010/0219690 A1 | 9/2010 | Femia et al. | |
| 2010/0265747 A1 | 10/2010 | Egiziano et al. | |
| 2010/0283326 A1 | 11/2010 | Kimball et al. | |
| 2011/0001360 A1 | 1/2011 | Rua et al. | |
| 2011/0026281 A1 | 2/2011 | Chapman et al. | |
| 2011/0084557 A1 | 4/2011 | Ger et al. | |
| 2011/0160930 A1 | 6/2011 | Batten et al. | |
| 2011/0264288 A1 | 10/2011 | Khajehoddin et al. | |

FOREIGN PATENT DOCUMENTS

| | | |
|---|---|---|
| CN | 1841823 | 10/2006 |
| CN | 1862942 | 11/2006 |
| CN | 101154115 | 4/2008 |
| CN | 101211192 | 7/2008 |
| CN | 101635540 | 1/2010 |
| CN | 101651436 | 2/2010 |
| CN | 101692599 | 4/2010 |
| CN | 101777777 | 7/2010 |
| CN | 101783621 | 7/2010 |
| CN | 101795101 | 8/2010 |
| CN | 101873091 | 10/2010 |
| JP | 2004240552 | 8/2004 |
| JP | 2004280220 | 10/2004 |
| JP | 2005070890 | 3/2005 |
| JP | 2008257309 | 10/2008 |
| TW | 200517803 | 6/2005 |
| TW | 200723653 | 6/2007 |
| TW | 200723665 | 6/2007 |
| TW | 200801889 | 1/2008 |
| TW | 201013360 | 4/2010 |
| TW | M381950 | 6/2010 |
| TW | 201042416 | 12/2010 |
| TW | 201104380 | 2/2011 |
| TW | 201107925 | 3/2011 |
| TW | 201140276 | 11/2011 |
| WO | WO 2009035995 | 3/2009 |
| WO | WO 2010122589 | 10/2010 |

OTHER PUBLICATIONS

Taiwan Patent Office, Notice of Allowance, Patent Application Serial No. 100144310, Mar. 18, 2014, Taiwan.

China Patent Office, Office Action, Patent Application Serial No. 20120014650.2, May 22, 2014, China.

Ehsan Behrouzian et al., "Power Electronics for Photovoltaic Energy System of an Oceanographic Buoy," Applied Power Electronics Colloquium (IAPEC), Apr. 2011, pp. 1-4, IEEE, US.

Sang-Yong Kim et al., "An Effective POS MPPT Control Method for PV Power Generation System," Electrical Machines and Systems, Nov. 2009, pp. 1-6, IEEE, US.

Florent Boico et al., "Study of Different Implementation Approaches for a Maximum Power Point Tracker," Computer in Power Electronics, Jul. 2006, pp. 15-21, IEEE, US.

Sungkyu Cho et al., "A Coreless Maximum Power Point Tracking Circuit of Thermoelectric Generators for Battery Charging," Asian Solid-State Circuits Conference, Nov. 2010, pp. 1-4, IEEE, China.

Zhigang Liang et al., "A New Cost-Effective Analog Maximum Power-Point Tracker for PV Systems," Energy Conversion Congress and Exposition (ECCE), Sep. 2010, pp. 624-631, IEEE, US.

P. Mattavelli et al., "A Simple Mixed-Signal MPPT Circuit for Photovoltaic Applications," Applied Power Electronics Conference and Exposition (APEC), Feb. 2010, pp. 953-960, IEEE, US.

Sang-Keun Ji et al., "Analog Control Algorithm for Maximum Power Tracker Employed in Photovoltaic Applications," IPEC, Oct. 2010, pp. 99-103, IEEE, US.

Dorin Petreus et al., "A Novel Maximum Power Point Tracker Based on Analog and Digital Control Loops," Solar Energy, Mar. 2011, pp. 588-600, vol. 85, Issue 3, Elsevier, US.

\* cited by examiner

MAXIMUM POWER POINT TRACKING CONTROLLERS AND MAXIMUM POWER POINT TRACKING METHODS

CROSS REFERENCE TO RELATED APPLICATIONS

The present application is based on, and claims priority from, Taiwan Application Serial Number 100144310, filed Dec. 2, 2011, the disclosure of which is hereby incorporated by reference herein in its entirety.

TECHNICAL FIELD

The present technical field relates to power convert systems, and in particular relates to a maximum power point tracking system.

BACKGROUND

Although renewable energy plays a small role among the world's electricity sources, however, limited fossil fuels and the side effect of the fossil fuels for the environment, has lead to increased importance in the development of renewable energy technologies. Therefore, the use of renewable energy is a way to replace fossil fuels.

However, the present maximum power point tracking system for the collection of renewable energy tracks the maximum power point by detecting the current of the renewable energy or by detecting the current and the voltage of the renewable energy at the same time. Therefore, the complexity and the cost of the present maximum power point tracking system are high such that the present maximum power point tracking system may not suitable for collecting renewable energy. Therefore, there is a need for a maximum power point tracking system to efficiently collect renewable energy.

SUMMARY

The disclosure provides an embodiment of a maximum power point tracking controller, suitable for controlling an output voltage of a power converter, including a slope detection unit and a control unit. The slope detection unit calculates whether the output voltage is in a positive trend or in a negative trend according to a detection signal corresponding to the output voltage in order to output a trend signal, wherein the voltage level of the trend signal is a first or second voltage level when the output voltage is in the positive or negative trend. The control unit has a first operation mode and a second operation mode to respectively increase and decrease a duty cycle of a PWM signal, wherein the control unit switches the current operation mode to perform a maximum power point tracking procedure when the trend signal is changed from the first voltage level to the second voltage level.

The disclosure also provides an embodiment of a maximum power point tracking system, comprising a power converter, a voltage detector and a maximum power point tracking controller. The power converter converts an energy, outputted from an energy harvester, to an output voltage according to a PWM signal for driving a loading. The voltage detector outputs a detection signal corresponding to the output voltage. The maximum power point tracking controller is coupled to the voltage detector to receive the detection signal, comprising a slope detection unit and a control unit. The slope detection unit calculates whether the output voltage is in a positive trend or in a negative trend according to the detection signal to output a trend signal, wherein a level of the trend signal is a first voltage level or a second voltage level when the output voltage is in the positive trend or the negative trend. The control unit has a first operation mode and a second operation mode to respectively increase and decrease a duty cycle of the PWM signal, wherein the control unit switches the current operation mode when the trend signal is changed from the first voltage level to the second voltage, thereby performing the maximum power point tracking procedure.

The disclosure also provides a maximum power point tracking method. The maximum power point tracking method includes the steps of: maintaining a current operation mode of a maximum power point tracking controller in a first state; entering a second state from the first state when a output voltage of a power converter is changed from a positive trend to a negative trend; switching the current operation mode of the maximum power point tracking controller in the second state and entering a third state; counting clock periods in the third state; and entering the second state from the third state and recounting the clock periods when a trend of the output voltage is not changed within N clock periods.

The disclosure also provides a maximum power point tracking method. The maximum power point tracking method includes the steps of: determining whether an output voltage of a power converter is changed from a positive trend to a negative trend; switching a current operation mode of a maximum power point tracking controller and starting to count clock periods when the output voltage is changed from the positive trend to the negative trend; and detecting whether the output voltage has been changed from the negative trend to the positive trend within N clock periods, wherein the current operation mode is switched when the output voltage is in the negative trend for N clock periods.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The slope of the disclosure is best determined by reference to the appended claims.

Figure 1:
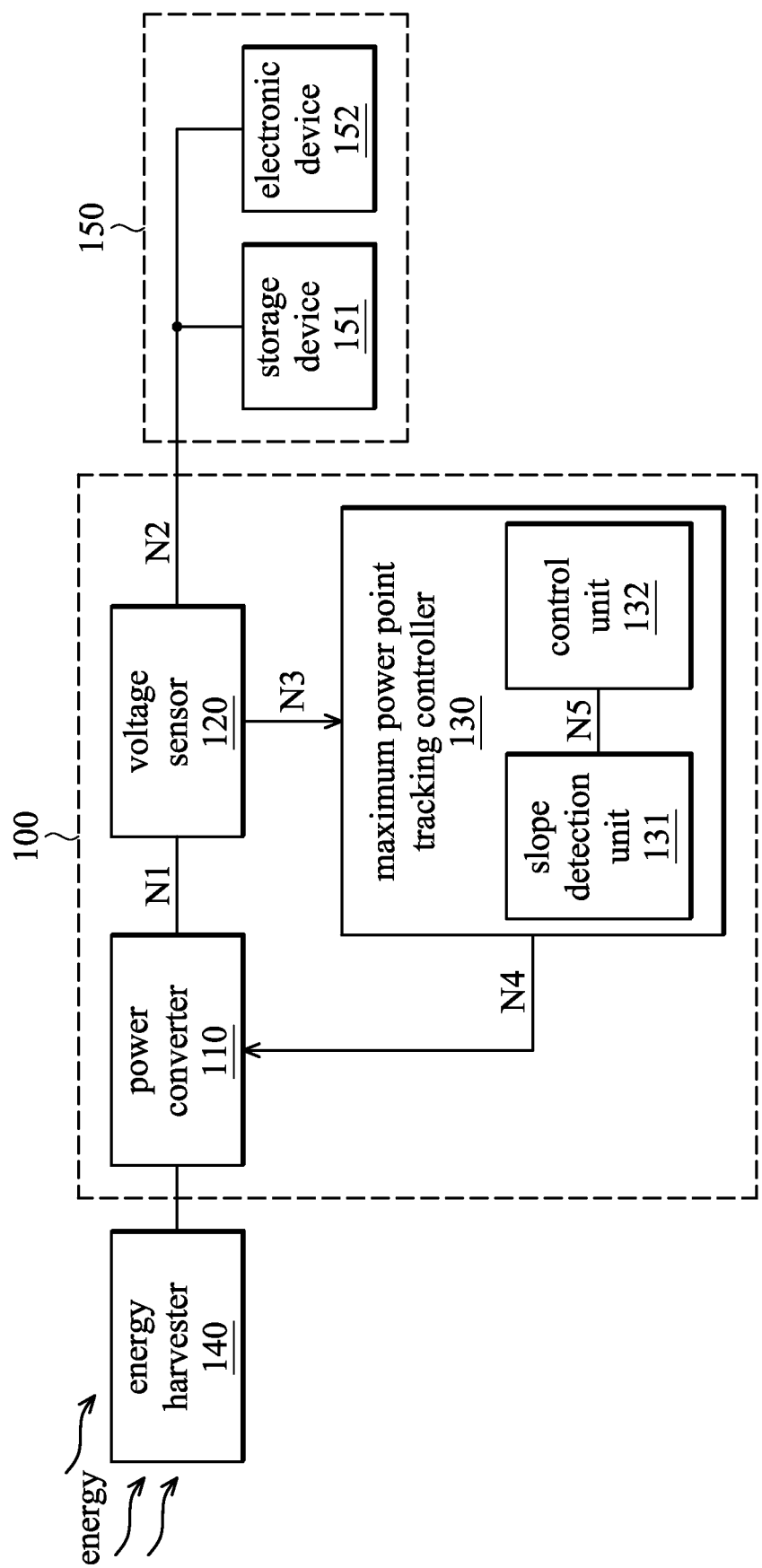
FIG. 1 illustrates a schematic view of a maximum power point tracking system in accordance with an embodiment.

FIG. 1 illustrates a schematic view of a maximum power point tracking system of the disclosure. As shown in FIG. 1, the maximum power point tracking system 100 includes a power converter 110, a voltage sensor 120 and a maximum power point tracking controller 130. The power converter 110 can be a DC-DC converter or a combination of a AC-DC rectifier and the DC-DC converter, but is not limited thereto. In detail, the power converter 110 converts power outputted by an energy harvester 140 to an output voltage N1 according to a pulse width modulation (PWM) signal N4 to drive a loading 150, wherein the loading 150 can be a storage device 151 and/or a general electronic device 152. The energy harvester 140 can be a solar cell panel, a wind turbine, a renewable energy generator or a thermoelectric generator, but is not limited thereto.

The voltage sensor 120 receives the output voltage N1, outputs the loading signal N2 to the loading 150 and outputs a detection signal N3 corresponding to the output voltage N1 to the maximum power point tracking controller 130. In the embodiment, the detection signal N3 is a voltage. In some embodiments, the detection signal N3 can be a current or power level, but is not limited thereto.

The maximum power point tracking controller 130 is coupled to the voltage sensor 120 to receive the detection signal N3 and controls the output voltage N1 of the power converter 110 by the PWM signal N4. The maximum power point tracking controller 130 has two operation modes OM1 and OM2 and three states S1, S2 and S3, in which the operation modes OM1 and OM2 are configured to control the duty cycle of the PWM signal N4, and the states S1, S2 and S3 are configured to determine whether the operation mode OM1 or OM2 is switched or not.

In detail, the maximum power point tracking controller 130 includes a slope detection unit 131 and a control unit 132. The slope detection unit 131 calculates that the output voltage N1 is in a positive trend or in a negative trend according to the detection signal N3 to output a trend signal N5, wherein the level of the trend signal N5 is a first voltage level (e.g., high voltage level) or a second voltage level (e.g., low voltage level) when the output voltage N1 is in the positive or negative trend. In some embodiments, the first voltage level can be a low voltage level, and the second voltage level can be a high voltage level.

The control unit 132 has the operation modes OM1 and OM2 to increase and decrease the duty cycle of the PWM signal N4, respectively. In some embodiments, the operation modes OM1 and OM2 are configured to respectively decrease and increase the duty cycle of the PWM signal N4, but are not limited thereto. When the trend signal N5 is changed from the first voltage level to the second voltage level, the control unit 132 switches the current operation mode (e.g., the operation mode OM1 is switched to the operation mode OM2, or the operation mode OM2 is switched to the operation mode OM1) to perform the maximum power point tracking procedure.

Figure 2:
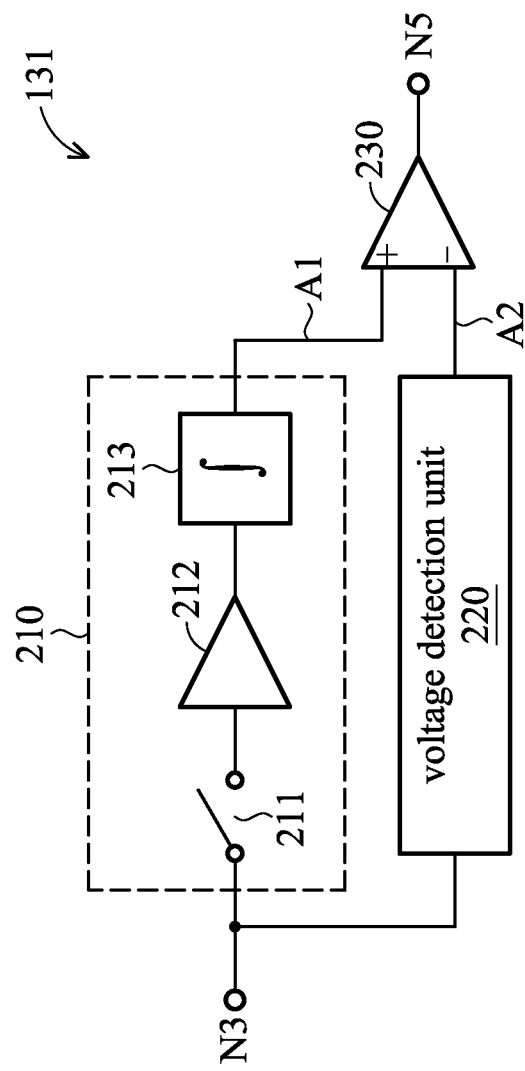
FIG. 2 illustrates a schematic view of the slope detection unit in accordance with an embodiment.
Figure 3:
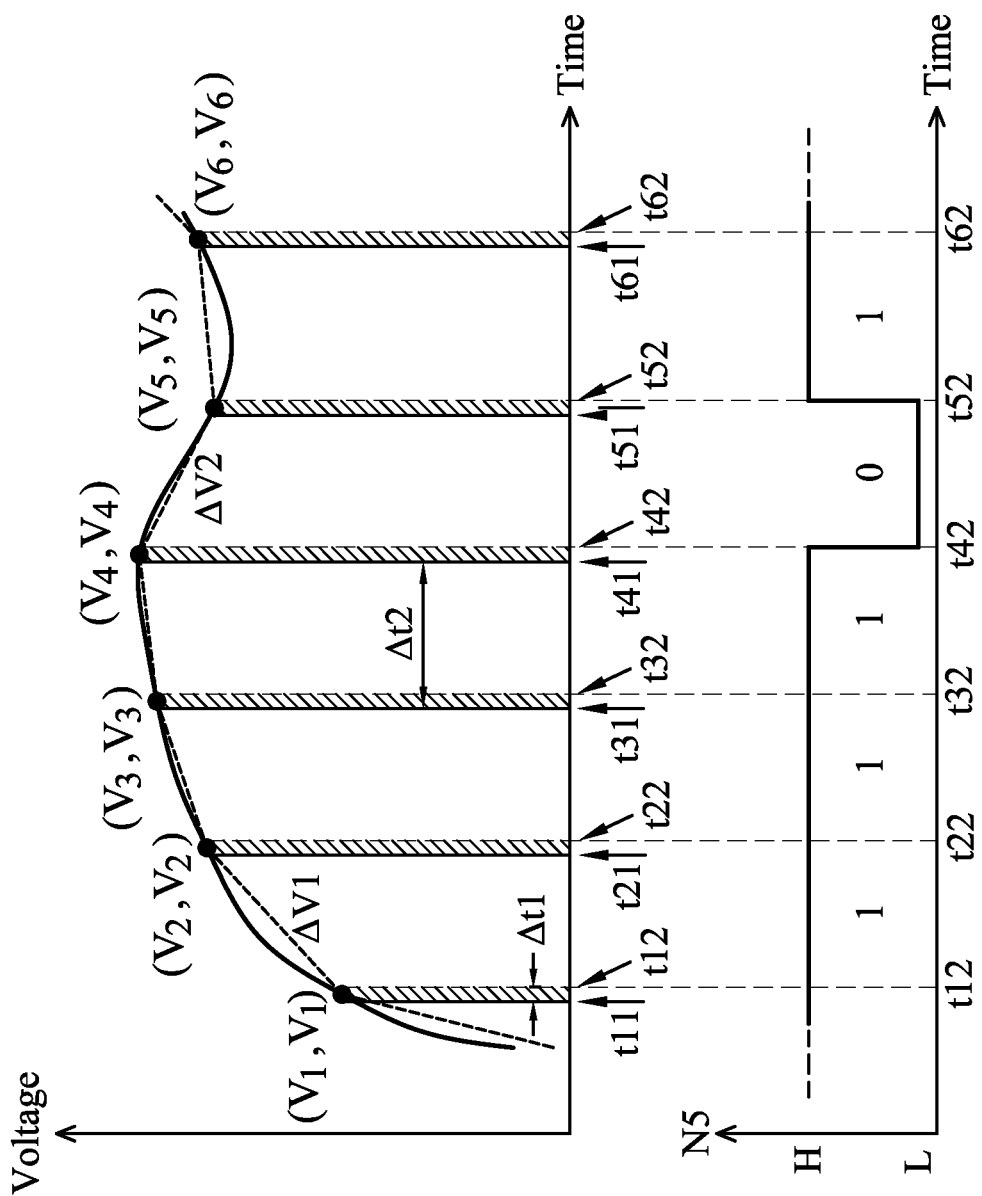
FIG. 3 illustrates a relationship between the output voltage N1, the trend signal N5 and time point in accordance with an embodiment.

FIG. 2 illustrates a schematic view of the slope detection unit of the disclosure. FIG. 3 illustrates a relationship between the output voltage N1, the trend signal N5 and time point of the disclosure. As shown in FIG. 2, the slope detection unit 131 includes voltage detection units 210 and 220 and a comparison unit 230. The voltage detection unit 210 detects the intensity of the detection signal N3 within a time interval Δt1 from a time point t21 (refer to FIG. 3) to output an amplified signal A1. The voltage detection unit 220 detects the intensity of the detection signal N3 within a time interval Δt1 from a time point t11 to output an amplified signal A2. The comparison unit 230 calculates the trend of the output voltage N1 during the time interval Δt2 according to the difference between the amplified signals A1 and A2, and determines the level of the trend signal N5 according to the trend of the output voltage N1. Note that the time interval Δt1 is shorter than the time interval Δt2.

In detail, the voltage detection unit 210 includes a switching unit 211, a transconductance amplifier 212 and an integrator 213. The switching unit 211 operates in an on-state for time interval Δt1 from the time point t21. The transconductance amplifier 212 is coupled to the switching unit 211 to convert the detection signal N3 from a voltage to current. The integrator 213 is coupled to the transconductance amplifier 212, and integrates a current of the detection signal N3 into an integrated voltage in order to output the amplified signal A1. Similarly, the voltage detection unit 220 includes a switching unit 221, a transconductance amplifier 222 and an integrator 223 (not shown). The features of the voltage detection units 220 and 210 are similar. Therefore, the illustration about the same features between the voltage detection units 210 and 220 is omitted for brevity.

The difference between the voltage detection units 220 and 210 is that the switching unit 221 operates in the on-state for the time interval Δt1 from the time point t11. Therefore, the integrator 223 outputs the amplified signal A2. In some embodiments, the integrators 213 and 223 can be capacitors, but are not limited thereto. The comparison unit 230 calculates the difference between the amplified signals A1 and A2 to obtain the trend of the output voltage N1 from the time point t11 to the time point t21. For example, when the value, generated by subtracting the amplified signal A2 from the amplified signal A1, is a positive value, the output voltage N1 is in the positive trend from the time point t11 to the time point t21. When the value, generated by subtracting the amplified signal A2 from the amplified signal A1, is a negative value, the output voltage N1 is in the negative trend form the time point t11 to the time point t21.

FIG. 3 illustrates a relationship between the output voltage N1, the trend signal N5 and time point of the disclosure. As shown in FIG. 3, the voltage detection unit 210 integrates the output voltage N1 from the time point t21 to the time point t22 to generate the amplified signal A1. The voltage detection unit 220 integrates the output voltage N1 from the time point t11 to the time point t12 to generate the amplified signal A2. The comparison unit 230 subtracts the amplified signal A2 from amplified signal A1 to generate the voltage difference ΔV1. In other words, the output voltage N1 is in the positive trend from the time point t11 to the time point t21 because the voltage difference ΔV1 (the voltage V2 is larger than the voltage V1) is a positive value. Therefore, the trend signal N5 outputted by the slope detection unit 131 operates in the first voltage level. In the embodiment, the first voltage level can be a high voltage level (e.g., 1). In some embodiments, the first voltage level can be a low voltage level (e.g., 0), but is not limited thereto.

The voltage detection unit 210 integrates the output voltage N1 from the time point t51 to the time point t52 to generate the amplified signal A1. The voltage detection unit 220 integrates the output voltage N1 from the time point t41 to the time point t42 to generate the amplified signal A2. The comparison unit 230 subtracts the amplified signal A2 from the amplified signal A1 to generate the voltage difference ΔV2. In other words, the output voltage N1 is in the negative trend from the time point t41 to the time point t51 because the voltage difference ΔV2 (the voltage V4 is larger than the voltage V5) is a negative value. Therefore, the trend signal N5 outputted by the slope detection unit 131 operates in the second voltage level. In the embodiment, the second voltage level can be a low voltage level (e.g., 0). In some embodiments, the second voltage level can be a high voltage level (e.g., 1), but is not limited thereto.

Figure 4C:
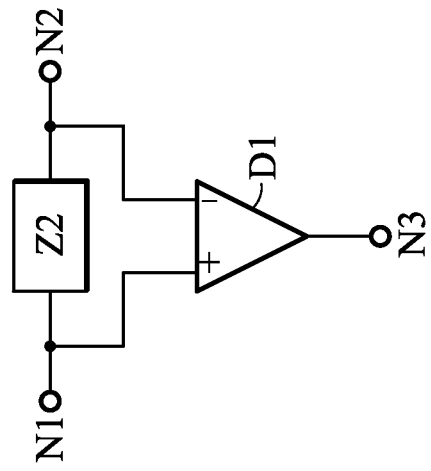
FIG. 4c illustrates an embodiment of the voltage sensor in accordance with an embodiment.
Figure 4B:
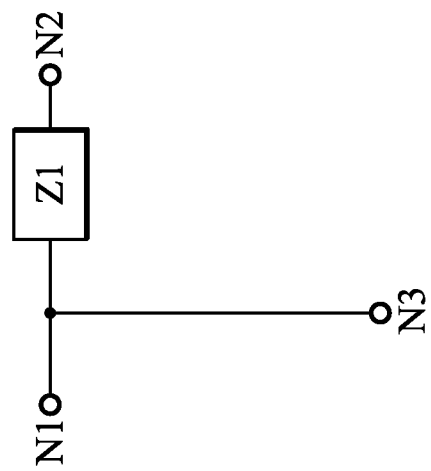
FIG. 4b illustrates an embodiment of the voltage sensor in accordance with an embodiment.
Figure 4A:
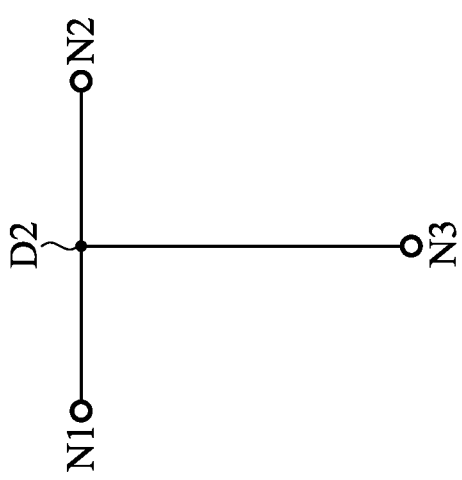
FIG. 4a illustrates an embodiment of the voltage sensor in accordance with an embodiment.

FIG. 4a illustrates an embodiment of the voltage sensor of the disclosure. As shown in FIG. 4a, the voltage sensor 120 is a node D2 coupled to the output voltage N1, the loading signal N2 and the detection signal N3.

FIG. 4b illustrates an embodiment of the voltage sensor of the disclosure. As shown in FIG. 4b, the voltage sensor 120 is an impedance unit Z1 having a first terminal coupled to the output voltage N1 and the detection signal N3 and a second terminal coupled to the loading signal N2.

FIG. 4c illustrates an embodiment of the voltage sensor of the disclosure. As shown in FIG. 4c, the voltage sensor 120 is a combination of an impedance unit Z2 and a differential amplifier D1. The impedance unit Z2 has a first terminal coupled to the output voltage N1 and a second terminal coupled to the loading 150. The differential amplifier D1 has a first terminal coupled to the first terminal of the impedance unit Z2 to receive the output voltage N1, and a second terminal coupled the second terminal of the impedance unit Z2 and the loading 150, and an output terminal outputting the detection signal N3.

Figure 5:
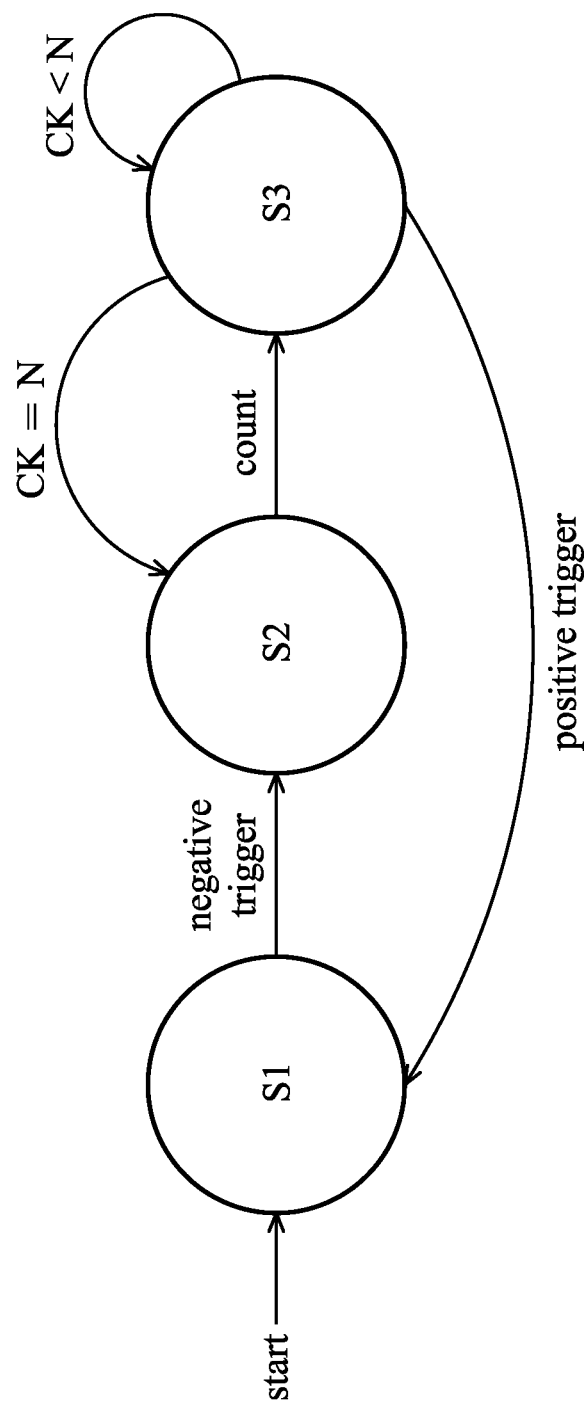
FIG. 5 illustrates a flowchart of the maximum power point tracking method in accordance with an embodiment with the finite state machine (FSM) system.

FIG. 5 illustrates a flowchart of the maximum power point tracking method of the disclosure with the finite state machine (FSM) system. As shown in FIG. 5, in the state S1, the current operation mode (e.g., one of the operation modes OM1 and OM2) of the maximum power point tracking controller 130 is maintained. For example, assume that the maximum power point tracking controller 130 operates in the operation mode OM1 before the maximum power point tracking controller 130 enters the state S1. When the maximum power point tracking controller 130 enters the state S1, the maximum power point tracking controller 130 is still operating in the operation mode OM1 and increases the duty cycle of the PWM signal N4.

In the state S2, the current operation mode of the maximum power point tracking controller 130 is switched and the maximum power point tracking controller 130 enters the state S3. For example, assume that the maximum power point tracking controller 130 operates in the operation mode OM1 before the maximum power point tracking controller 130 enters the state S2. When the maximum power point tracking controller 130 enters the state S2, the maximum power point tracking controller 130 switches to the operation mode OM2 and decreases the duty cycle of the PWM signal N4. In addition, when the output voltage N1 is changed from the positive trend to the negative trend, the maximum power point tracking controller 130 enters the state S2 soon thereafter.

In the state S3, the clock periods CK are counted. In detail, after the operation mode of the maximum power point tracking controller 130 is switched, the maximum power point tracking controller 130 enters the state S3 and starts to count the clock periods CK. When the trend of the output voltage N1 is not changed within N clock periods (e.g., the trend of the output voltage N1 is not changed from the negative trend to the positive trend within N clock periods), it means that the control unit 132 misjudges the trend of the output voltage N1. Therefore, the maximum power point tracking controller 130 enters the state S2 from the state S3 and switches the current operation mode (e.g., the operation mode OM2 is switched to the operation mode OM1) to recount the clock periods CK.

When the output voltage N1 is changed to the positive trend from the negative trend within N clock periods CK, the maximum power point tracking controller 130 enters the state S1 from the state S3 and stops counting the clock periods CK. The maximum power point tracking controller 130 enters the state S2 only when the output voltage N1 turns to the negative trend from the positive trend.

Figure 6:
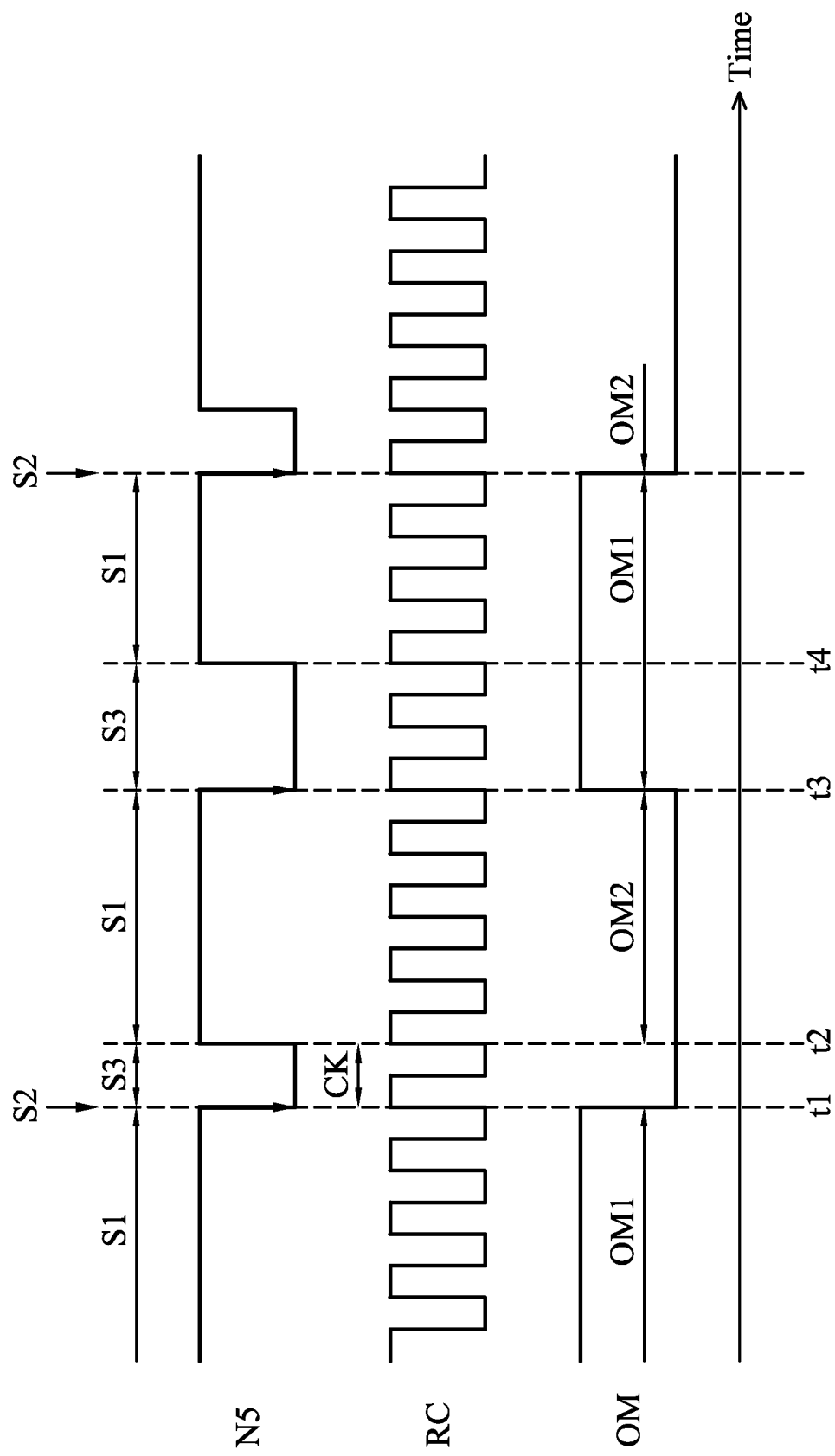
FIG. 6 illustrates a sequence diagram of the trend signal N5, the operation modes and reference clock RC in accordance with an embodiment.

FIG. 6 illustrates a sequence diagram of the trend signal N5, the operation modes and reference clock RC of the disclosure. As shown in FIG. 6, the trend signal N5 is changed from the first voltage level to the second voltage level at time point t1. In other words, the output voltage N1 turns to the negative trend from the positive trend. Therefore, the control unit 132 of the maximum power point tracking controller 130 enters the state S2 and the operation mode OM1 is switched to the operation mode OM2 to decrease the duty cycle of the PWM signal N4. After the control unit 132 switches the current operation mode, the control unit 132 enters the state S3 and starts to count the clock periods CK.

At the time point t2, the trend signal N5 is changed from the second voltage level to the first voltage level. In other words, the output voltage N1 is changed from the negative trend to the positive trend within N clock periods (assume that N=5). Therefore, the control unit 132 enters the state S1 from the state S3 and keeps operating in the operation mode OM2 to continuously decrease the duty cycle of the PWM signal N4.

In the time point t3, the trend signal N5 is changed from the first voltage level to the second voltage level. In other words, the output voltage N1 is changed from the positive trend to the negative trend. Thus, the control unit 132 enters the state S2 and the operation mode OM2 is switched to the operation mode OM1 to increase the duty cycle of the PWM signal N4. After the control unit 132 switches the current operation mode, the control unit 132 enters the state S3 and starts to count the clock periods CK. The rest of the sequence may be deduced by analogy and is omitted for brevity.

Figure 7:
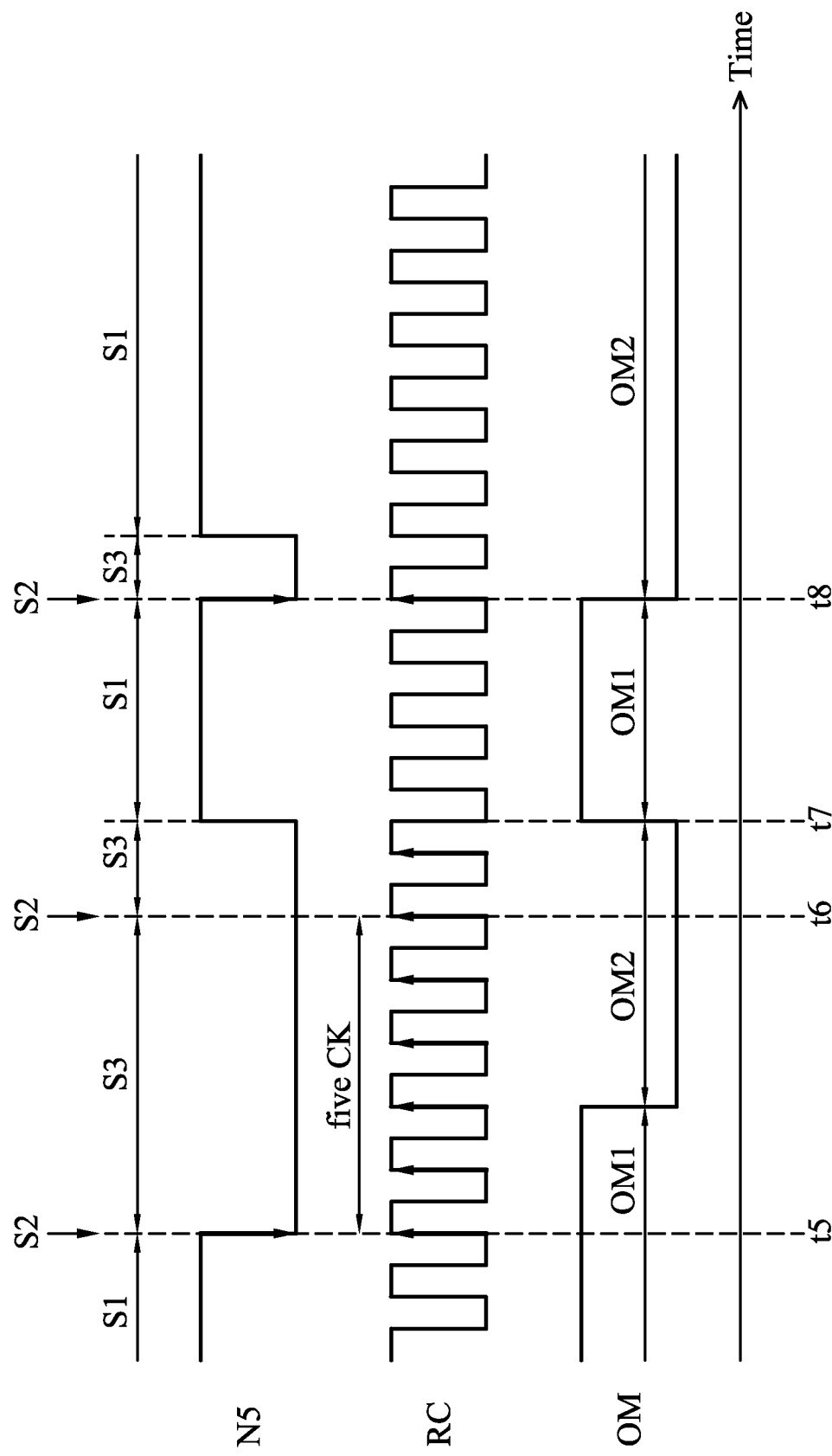
FIG. 7 illustrates another sequence diagram of the trend signal N5, the operation modes and reference clock RC in accordance with an embodiment to describe a condition where the control unit 132 misjudges the trend of the output voltage N1.

FIG. 7 illustrates another sequence diagram of the trend signal N5, the operation modes and reference clock RC of the disclosure to describe a condition where the control unit 132 misjudges the trend of the output voltage N1. As shown in FIG. 7, the trend signal N5 is changed from the first voltage level to the second voltage level. In other words, the output voltage N1 is changed from the positive trend to the negative trend. Therefore, the control unit 132 of the maximum power point tracking controller 130 enters the state S2 and switches from the operation mode OM1 to the operation mode OM2 to decrease the duty cycle of the PWM signal N4. After the control unit 132 switches the current operation mode, the control unit 132 enters the state S3 and starts to count the clock periods CK.

However, after the control unit 132 counts the five clock periods CK, the trend signal N5 is never changed from the second voltage level to the first voltage level. Therefore, the maximum power point tracking controller 130 misjudges the trend of the output voltage N1 at the time point t5. Thus, the control unit 132 enters the state S2 at the time point t6 to change the operation mode (the operation mode OM2 is switched to the operation mode OM1), thereby the duty cycle of the PWM signal N4 is increased.

The trend signal N5 is changed from the second voltage level to the first voltage level within the 5 clock periods CK from the time point t7. In other words, the output voltage N1 is changed from the negative trend to the positive trend. Therefore, the control unit 132 of the maximum power point tracking controller 130 enters the state S1 and keeps operating in the operation mode OM1 until the trend signal N5 is changed from the first voltage level to the second voltage level.

Figure 8:
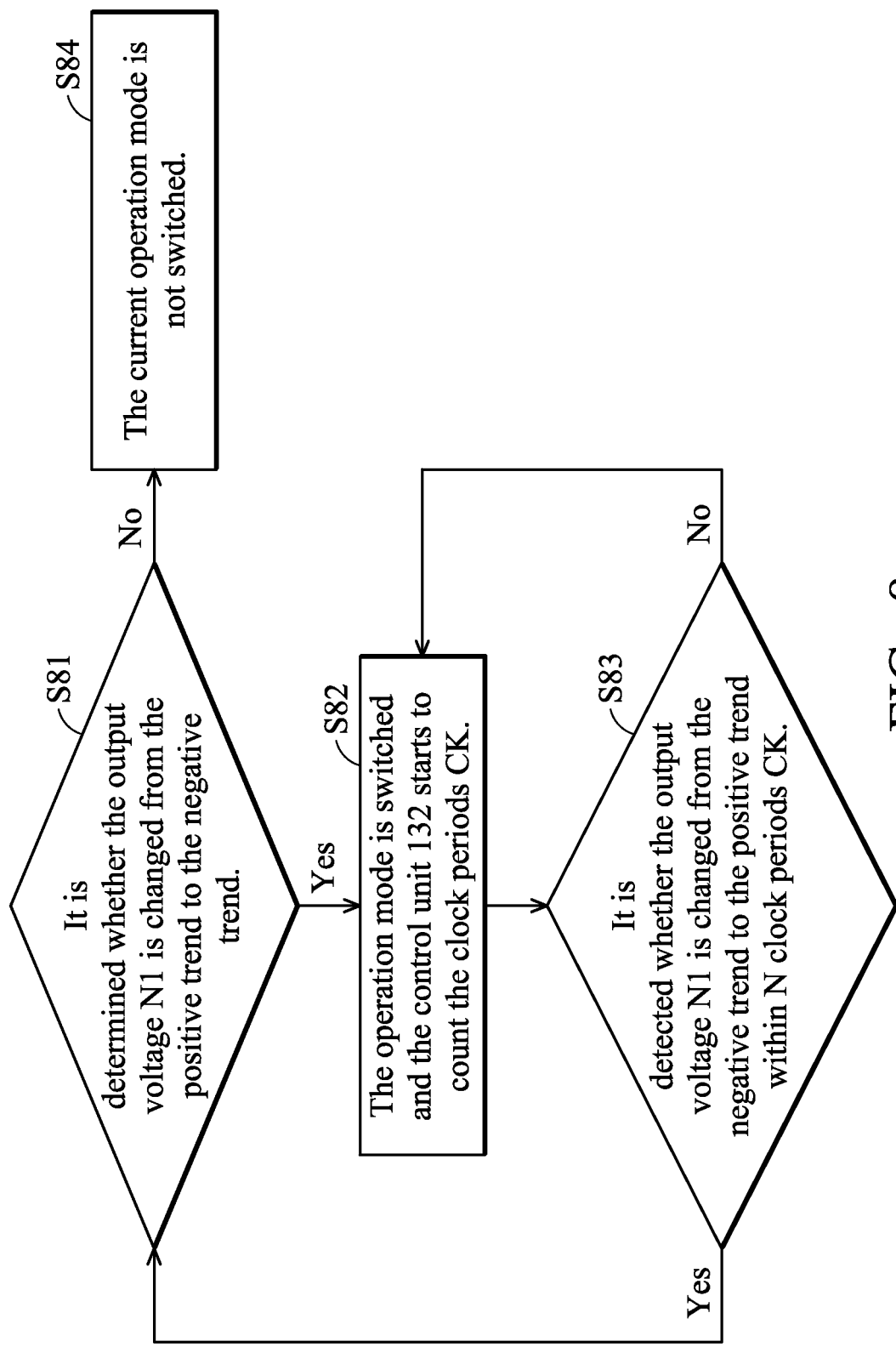
FIG. 8 illustrates another flowchart of the maximum power point tracking method in accordance with an embodiment.

FIG. 8 illustrates another flowchart of the maximum power point tracking method of the disclosure. In step S81, it is determined whether the output voltage N1 is changed from the positive trend to the negative trend. When the output voltage N1 is not changed from the positive trend to the negative trend, the procedure enters the step S84 and the current operation mode is not switched. When the output voltage N1 changes from the positive trend to the negative trend, the procedure enters the step S82 and the operation mode is switched and the control unit 132 starts to count the clock periods CK. In step S83, it is detected whether the output voltage N1 is changed from the negative trend to the positive trend within N clock periods CK. If the output voltage N1 is changed from the negative trend to the positive trend within N clock periods CK, the procedure goes back step S81. If the output voltage N1 is not changed from the negative trend to the positive trend within N clock periods CK, the procedure goes back step S82. The maximum power point tracking controller 130 does not stop performing steps S81~S84 to perform the maximum power point tracking procedure.

Figure 9:
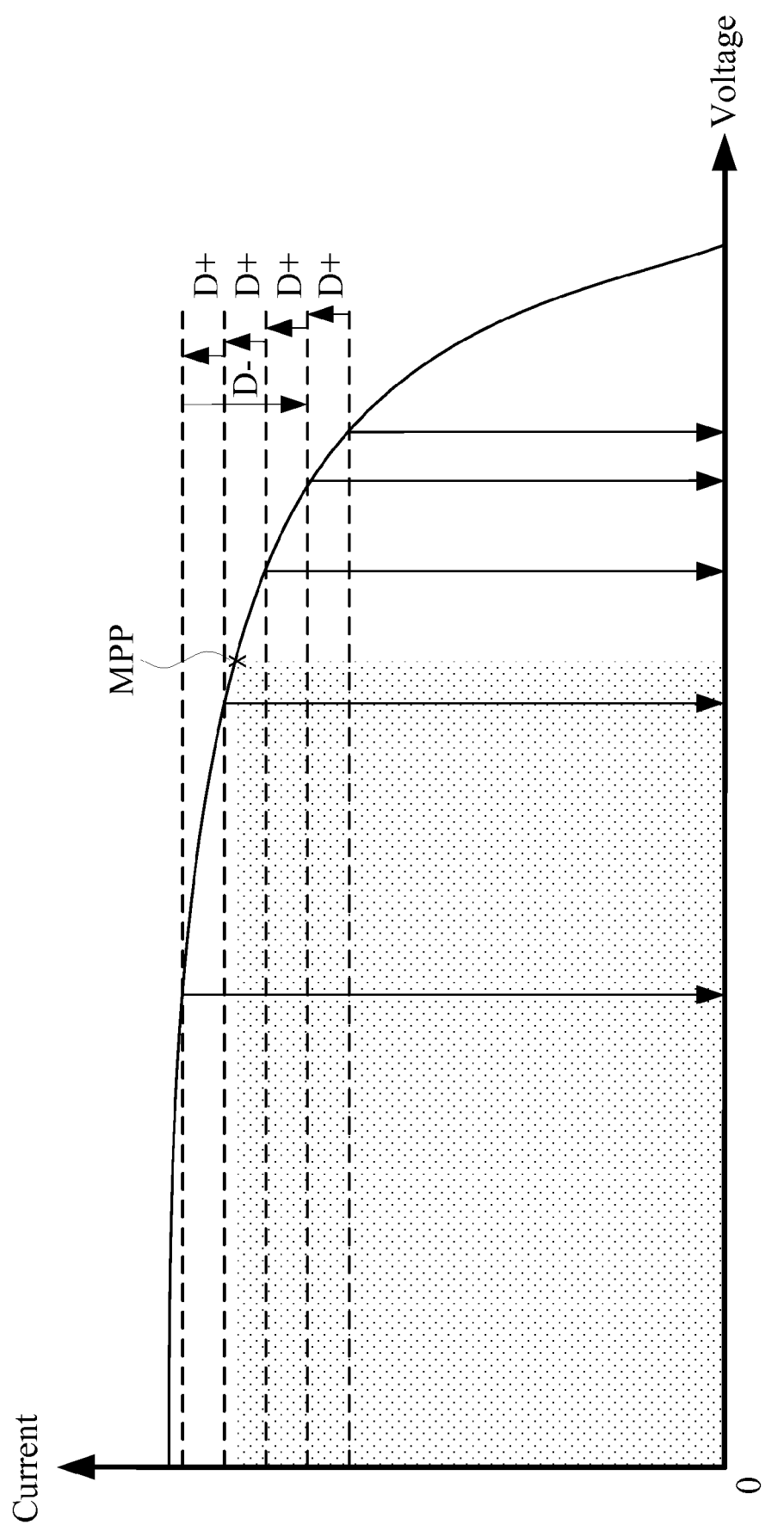
FIG. 9 illustrates a relationship between the output voltage and the output current in accordance with an embodiment.

FIG. 9 illustrates a relationship between the output voltage and the output current of the disclosure. As shown in FIG. 9, in the embodiment, the increase and the decrease on the duty cycle of the PWM signal N4 can be different for the maximum power point tracking controller 130 to reach the maximum power point quickly. In detail, when the duty cycle is increased, D=D*+A*C. When the duty cycle is decreased, D=D*−B*C, in which D and D* are duty cycles, and A, B and C are different constants. In the embodiment, A is not equal to B. In some embodiments, A is equal to B. As shown in FIG. 9, the increase D+ in current is less than the decrease D− in current. Therefore, A is smaller than B, thereby the duty cycle is slightly increased in the condition that the output voltage is varied rapidly, and the duty cycle is rapidly decreased in the condition that the output voltage is varied slightly.

Figure 10:
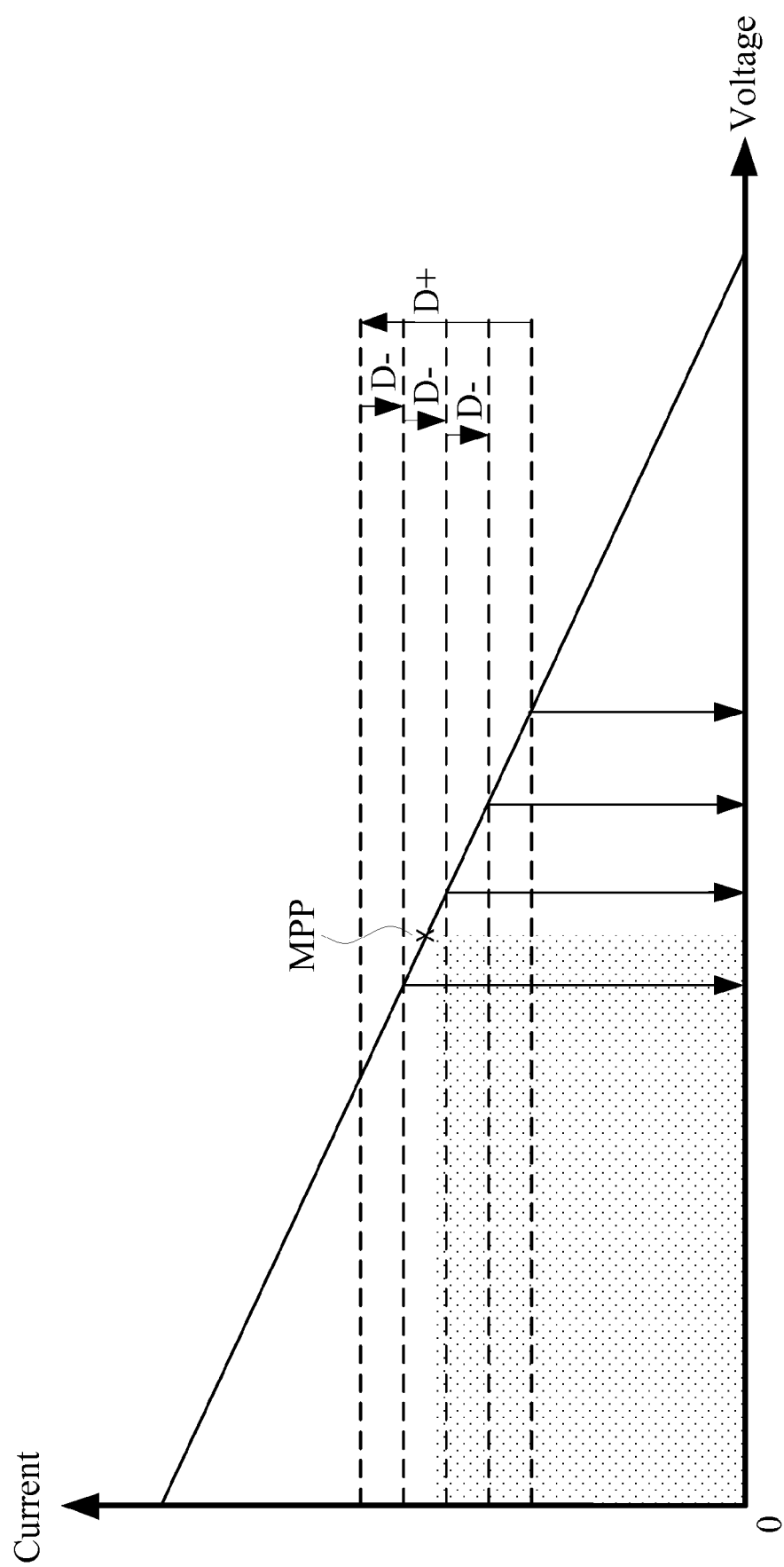
FIG. 10 illustrates another relationship between the output voltage and the output current in accordance with an embodiment.

FIG. 10 illustrates another relationship between the output voltage and the output current of the disclosure. As shown in FIG. 10, the increase D+ in current is larger than the decrease D− in current. Therefore, A is larger than B such that the duty cycle is rapidly increased at the points that are far from the maximum power point MPP, and the duty cycle is slightly decreased at the points that are near to the maximum power point MPP.

Figure 11:
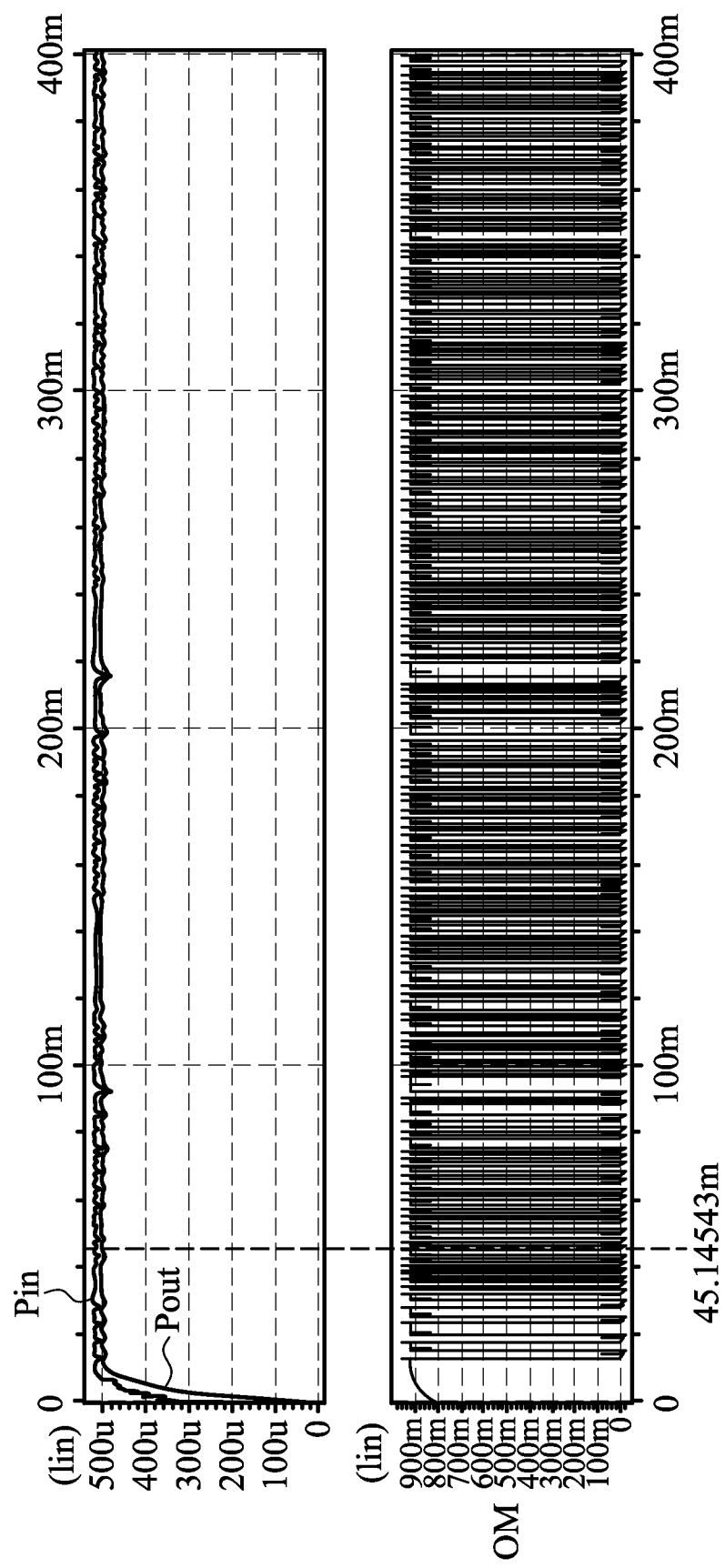
FIG. 11 illustrates waveforms of the input power, output power and operation modes in accordance with an embodiment.

FIG. 11 illustrates waveforms of the input power, output power and operation modes of the disclosure. As shown in FIG. 11, the operation modes OM1 and OM2 are rapidly switched. When the illumination of the sunshine is 2000 lux, the maximum power of the energy harvester 140 (e.g. solar cell panel) is 519.693 uW. By the use of the maximum power point tracking system 100 of the disclosure, the output power (i.e., the input power Pin) of the energy harvester 140 rapidly reaches the maximum power point. The input power Pin of the power converter 110 is 518.95 uW, and the output power Pout of the power converter 110 is 501.42 uW. $\eta_{MPPT}$ and $\eta_{MPPT}$ are respectively 99.85% and 96.62%. Because $\eta_{MPPT}$ is close to 100%, the maximum power point of the maximum power point tracking system 100 is very close to the real maximum power point.

The voltage detection units 210 and 220 of the disclosure respectively integrate the current of the detection voltage N3 with a time interval and amplify the voltage difference between the output voltage N1 of the power converter 110 from two different time points, the control unit 132 easily recognizes the trend of the output voltage N1. Furthermore, the use of the maximum power point tracking method can decrease the times that the control unit 132 misjudges and decrease the time spent on the maximum power point tracking procedure. The maximum power point tracking system 100 does not need to detect the output current and the output voltage at the same time for tracking the maximum power point, the complexity and the cost of the circuit of the disclosure are decreased.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same features of the embodiments introduced herein. Those skilled in the art should also realize that such equivalent constructions do not depart from the spirit and slope of the present disclosure, and that they may make various changes, substitutions and alterations herein without departing from the spirit and slope of the present disclosure.

What is claimed is:

1. A maximum power point tracking controller, suitable for controlling an output voltage of a power converter, comprising:
a slope detection unit, calculating whether the output voltage is in a positive trend or in a negative trend according to a detection signal corresponding to the output voltage in order to output a trend signal, wherein a voltage level of the trend signal is a first voltage level or a second voltage level when the output voltage is in the positive trend or the negative trend, wherein the slope detection unit comprises:
a first voltage detection unit, integrating the detection signal within a first time interval from a first time point to output a first amplified signal;
a second voltage detection unit, integrating the detection signal within the first time interval from a second time point later than the first time point to output a second amplified signal, wherein a difference between the first time point and the second time point is a second time interval; and
a comparison unit, calculating a trend of the output voltage from the first time point to the second time point according to the difference between the first amplified signal and the second amplified signal, and determining the voltage level of the trend signal according to the trend of the output voltage; and
a control unit, having a first operation mode and a second operation mode to respectively increase and decrease a duty cycle of a PWM signal, wherein the control unit switches a current operation mode to perform a maximum power point tracking procedure when the trend signal is changed from the first voltage level to the second voltage level.

2. The maximum power point tracking controller as claimed in claim 1, wherein the detection signal is a voltage, a current or a power level.

3. The maximum power point tracking controller as claimed in claim 1, wherein the first voltage detection unit comprises:
   a first switching unit, operating in an on-state for the first time interval from the first time point;
   a first transconductance amplifier, coupled to the first switching unit to convert the detection signal from voltage into current; and
   a first integrator, coupled to the first transconductance amplifier to integrate current of the detection signal into a first integrated voltage within the first time interval, such that the first amplified signal is generated.

4. The maximum power point tracking controller as claimed in claim 3, wherein the second voltage detection unit comprises:
   a second switching unit, operating in the on-state for the second time interval from the first time point;
   a second transconductance amplifier, coupled to the second switching unit to convert the detection signal from voltage into current; and
   a second integrator, coupled to the second transconductance amplifier to integrate current of the detection signal into a second integrated voltage within the first time interval, such that the second amplified signal is generated.

5. The maximum power point tracking controller as claimed in claim 4, wherein the first integrator and the second integrator are capacitors.

6. The maximum power point tracking controller as claimed in claim 1, wherein the control unit switches the current operation mode when the trend signal is not changed to the first voltage level from the second voltage level after N clock periods.

7. The maximum power point tracking controller as claimed in claim 1, wherein the control unit does not switch the current operation mode when the trend signal is changed to the first voltage level from the second voltage level.

8. The maximum power point tracking controller as claimed in claim 1, wherein increasing on the duty cycle is not equal to decreasing on the duty cycle.

9. A maximum power point tracking system, comprising:
   a power converter, converting an energy, outputted from an energy harvester, to an output voltage according to a PWM signal for driving a loading;
   a voltage detector, outputting a detection signal corresponding to the output voltage; and
   a maximum power point tracking controller, coupled to the voltage detector to receive the detection signal, comprising:
      a slope detection unit, calculating whether the output voltage is in a positive trend or in a negative trend according to the detection signal to output a trend signal, wherein a voltage level of the trend signal is a first voltage level or a second voltage level when the output voltage is in the positive trend or the negative trend, wherein the slope detection unit comprises:
         a first voltage detection unit, integrating the detection signal within a first time interval from a first time point to output a first amplified signal;
         a second voltage detection unit, integrating the detection signal within the first time interval from a second time point later than the first time point to output a second amplified signal, wherein a difference between the first time point and the second time point is a second time interval; and
      a comparison unit, calculating a trend of the output voltage from the first time point to the second time point according to a difference between the first amplified signal and the second amplified signal, and determining the voltage level of the trend signal according to the trend of the output voltage; and
      a control unit, having a first operation mode and a second operation mode to respectively increase and decrease a duty cycle of the PWM signal, wherein the control unit switches a current operation mode when the trend signal is changed from the first voltage level to the second voltage level, thereby performing a maximum power point tracking procedure.

10. The maximum power point tracking system as claimed in claim 9, wherein the detection signal is a voltage, a current or a power level.

11. The maximum power point tracking system as claimed in claim 9, wherein the first voltage detection unit comprises:
   a first switching unit, operating in an on-state for the first time interval from the first time point;
   a first transconductance amplifier, coupled to the first switching unit to convert the detection signal from voltage into current; and
   a first integrator, coupled to the first transconductance amplifier to integrate current of the detection signal into a first integrated voltage within the first time interval, such that the first amplified signal is generated.

12. The maximum power point tracking system as claimed in claim 11, wherein the second voltage detection unit comprises:
   a second switching unit, operating in the on-state for the first time interval from the second time point;
   a second transconductance amplifier, coupled to the second switching unit to convert the detection signal from voltage into current; and
   a second integrator, coupled to the second transconductance amplifier to integrate current of the detection signal into a second integrated voltage within the first time interval, such that the second amplified signal is generated.

13. The maximum power point tracking system as claimed in claim 12, wherein the first integrator and the second integrator are capacitors.

14. The maximum power point tracking system as claimed in claim 9, wherein the control unit switches the current operation mode when the trend signal is not changed to the first voltage level from the second voltage level after N clock periods.

15. The maximum power point tracking system as claimed in claim 9, wherein the control unit does not switch the current operation mode when the trend signal is changed to the first voltage level from the second voltage level.

16. The maximum power point tracking system as claimed in claim 9, wherein increasing the duty cycle is not equal to decreasing the duty cycle.

17. The maximum power point tracking system as claimed in claim 9, wherein the power converter is a DC-DC converter or an AC-DC rectifier.

18. The maximum power point tracking system as claimed in claim 9, wherein the voltage detector comprises:
   an impedance unit, having a first terminal to receive the output voltage and a second terminal coupled to the loading; and
   a differential amplifier, having a first terminal coupled to the first terminal of the impedance unit, a second terminal coupled to the second terminal of the impedance unit and an output terminal outputting the detection signal.

19. A maximum power point tracking method, comprising:
maintaining a current operation mode of a maximum power point tracking controller in a first state;
entering a second state from the first state when an output voltage of a power converter is changed from a positive trend to a negative trend;
switching the current operation mode of the maximum power point tracking controller in the second state and entering a third state;
counting clock periods in the third state; and
entering the second state from the third state and recounting the clock periods when a trend of the output voltage is not changed within N clock periods,
wherein the first state is entered to from the third state and the clock periods stop being counted when the output voltage is changed from the negative trend to the positive trend within N clock periods.

20. The maximum power point tracking method as claimed in claim 19, wherein the maximum power point tracking controller increases a duty cycle of a PWM signal in a first operation mode.

21. The maximum power point tracking method as claimed in claim 19, wherein the maximum power point tracking controller decreases a duty cycle of a PWM signal in a second operation mode.

22. The maximum power point tracking method as claimed in claim 19, further comprising:
integrating a detection signal corresponding to the output voltage within a first time interval from a first time point in order to output a first amplified signal;
integrating the detection signal within the first time interval from a second time point later than the first time point in order to output a second amplified signal, wherein a difference between the first time point and the second time point is a second time interval; and
calculating the trend of the output voltage from the first time point to the second time point according to a difference between the first amplified signal and the second amplified signal.

23. The maximum power point tracking method as claimed in claim 22, wherein the first time interval is shorter than the second time interval.

24. A maximum power point tracking method, comprising:
determining whether an output voltage of a power converter is changed from a positive trend to a negative trend;
switching a current operation mode of a maximum power point tracking controller and starting to count clock periods when the output voltage is changed from the positive trend to the negative trend; and
detecting whether the output voltage has been changed from the negative trend to the positive trend within N clock periods, wherein the current operation mode is switched when the output voltage is in the negative trend for N clock periods; and
stopping the counting of the clock periods when the output voltage is changed from the negative trend to the positive trend within N clock periods.

25. The maximum power point tracking method as claimed in claim 24, wherein the maximum power point tracking controller increases a duty cycle of a PWM signal in a first operation mode.

26. The maximum power point tracking method as claimed in claim 24, wherein the maximum power point tracking controller decreases a duty cycle of a PWM signal in a second operation mode.

27. The maximum power point tracking method as claimed in claim 24, further comprising:
integrating a detection signal corresponding to the output voltage within a first time interval from a first time point in order to output a first amplified signal;
integrating the detection signal within the first time interval from a second time point later than the first time point in order to output a second amplified signal, wherein a difference between the first time point and the second time point is a second time interval; and
calculating a trend of the output voltage from the first time point to the second time point according to a difference between the first amplified signal and the second amplified signal.

28. The maximum power point tracking method as claimed in claim 27, wherein the first time interval is shorter than the second time interval.

* * * * *